United States Patent
Chou

(10) Patent No.: US 8,413,249 B1
(45) Date of Patent: Apr. 2, 2013

(54) THREAT ASSESSMENT OF SOFTWARE-CONFIGURED SYSTEM BASED UPON ARCHITECTURE MODEL AND AS-BUILT CODE

(75) Inventor: Andy C Chou, San Francisco, CA (US)

(73) Assignee: Coverity, Inc., San Francisco, CA (US)

( * ) Notice: Subject to any disclaimer, the term of this patent is extended or adjusted under 35 U.S.C. 154(b) by 108 days.

(21) Appl. No.: 12/895,847

(22) Filed: Sep. 30, 2010

(51) Int. Cl.
G06F 11/00 (2006.01)

(52) U.S. Cl. ............... 726/25; 726/22; 726/23; 726/24; 713/188; 713/189

(58) Field of Classification Search ............. 726/22–25; 713/188–189; 717/100, 104
See application file for complete search history.

(56) References Cited

U.S. PATENT DOCUMENTS

| | | | |
|---|---|---|---|
| 5,335,344 | A | 8/1994 | Hastings |
| 7,284,274 | B1 | 10/2007 | Walls et al. |
| 7,340,726 | B1 | 3/2008 | Chelf et al. |
| 8,156,558 | B2 * | 4/2012 | Goldfeder et al. ............. 726/25 |
| 2004/0230835 | A1 * | 11/2004 | Goldfeder et al. ............ 713/201 |
| 2006/0070043 | A1 | 3/2006 | Viega |
| 2007/0162890 | A1 * | 7/2007 | Meier et al. .................. 717/100 |
| 2007/0168998 | A1 | 7/2007 | Mehta et al. |
| 2008/0209566 | A1 * | 8/2008 | Ziv ................................ 726/25 |
| 2008/0263506 | A1 * | 10/2008 | Broadfoot et al. ............ 717/104 |
| 2009/0083695 | A1 * | 3/2009 | Mir et al. ...................... 717/104 |
| 2009/0327943 | A1 * | 12/2009 | Medvedev et al. ............ 715/772 |
| 2011/0126288 | A1 * | 5/2011 | Schloegel et al. ............. 726/25 |

OTHER PUBLICATIONS

"BinScope Overview and Demo", [online]. [archived Oct. 9, 2010]. Retrieved from the Internet: <URL: http://web.archive.org/web/20101009005712/ http://technet.microsoft.com/en-us/edge/binscope-overview-and-demo.aspx, (Sep. 16, 2009), 3 pgs.

"SDL Threat Modeling School", (c) 2011 Microsoft. [online]. Retrieved from the Internet: <URL: http://www.microsoft.com/security/sdl/adopt/threatmodeling.aspx>, (2011), 1 pg.

(Continued)

Primary Examiner — Andrew L Nalven
Assistant Examiner — Amir Mehrmanesh
(74) Attorney, Agent, or Firm — Schwegman Lundberg & Woessner, P.A.

(57) ABSTRACT

A method comprising: providing in a non-transitory machine readable storage device a first information structure that includes respective elements that each respectively represent one or more components or communication channels or a combination thereof of a system that includes one or more machines configured with computer software; wherein the first information structure associates at least one element with at least one of an attribute indicative of a mitigation of one at least one known vulnerability of the at least one component or communication channel or combination thereof represented by the at least one element; using a computer system to produce and to store within a non-transitory machine readable storage device an analysis of as-built code used to configure one or more machines to implement the system; wherein the produced analysis includes an output log with respective entries that include respective code references and respective indicia of attributes corresponding to respective observation points within the as-built code that correspond respective elements of the first information structure; mapping at least one respective entry to at least the at least one element of the first information structure; and associating an attribute included within the at least one entry with an attribute associated within the first information structure with the at least one element.

22 Claims, 9 Drawing Sheets

OTHER PUBLICATIONS

Cohn, R., "Dynamic Instrumentation With Pin", Workshop Slides, Center for Scalable Application Development Software, [online]. [archived Jun. 13, 2010], Retrieved from the Internet: <URL: http://web.archive.org/web/20100613120637/http://cscads.rice.edu/workshops/july2007/perf-slides-07/Cohn-Pin.pdf>, (Jul. 2007), 34 pgs.

Luk. C.-K., et al., "Pin: Building Customized Program Analysis Tools with Dynamic Instrumentation", *Proceedings of the 2005 ACM SIGPLAN Conference on Programming Language Design and Implementation (PLDI '05), ACM SIGPLAN Notices*, 40(6), (2005), 1-11.

Schmerl, B., et al., "Discovering Architectures from Running Systems", *IEEE Transactions on Software Engineering* 32(7), (Jul. 2006), 454-466.

Yan, H., et al., "DiscoTect: A System for Discovering Architectures from Running Systems", *Proceedings of the 2004 International Conference on Software Engineering*, (Edinburgh, Scotland), (May 2004), 10 pgs.

\* cited by examiner

THREAT ASSESSMENT OF SOFTWARE-CONFIGURED SYSTEM BASED UPON ARCHITECTURE MODEL AND AS-BUILT CODE

BACKGROUND OF THE INVENTION

1. Field of the Invention

The invention generally relates to assessment of vulnerabilities in systems configured using software, and more particularly, to assessments using a system architecture model.

2. Description of the Related Art

There is a broadly recognized need for application security in all phases of the software development life cycle. A weakness in a software system, which can be a design flaw or an implementation error that allows an attacker to cause harm to stakeholders of the system is referred to as 'vulnerability'. A threat model for a system configured using software may define a set of possible vulnerabilities that could result in compromises to the system. One approach to threat modeling involves identifying components and trust boundaries within an architecture model of the system. A trust boundary provides a demarcation within a system. On one side of the demarcation, data is believed to be trustworthy, and on the other side of the demarcation, data is believed to be untrustworthy.

A software-configured system architecture model provides a representation of behavior of a system configured using software. More particularly, the architecture model ordinarily represents the configuration of one or more component hardware machines (e.g., personal computers, network interface adapters, storage interface adapters, servers, routers, switches, etc.) according to computer software. It will be appreciated that configuration of a system of machines may be dynamic in that program code may configure machines to perform the roles of different system components at different moments during runtime operation. For example, at one moment, a machine (e.g., a computer) may be configured as a component that creates a network connection with a web server over the Internet, and at another moment, the same machine may be configured as a component that accesses a database within storage over a local area network.

There are a variety of ways in which to portray a software-configured system architecture model. One approach is to provide a high-level view of a system in terms of its principle runtime components (e.g., clients, servers, databases), their interactions (e.g., remote procedure call, event multicast, piped streams), and their properties (e.g., throughputs, latencies, reliabilities). Another useful approach involves a data flow diagram that shows principle runtime components and the data flow between them. A UML diagram can provide yet another view of an architecture model.

Trust boundaries identify regions of a software system architecture model that are especially vulnerable to attack, for example. For example, a software architecture model may indicate data movement across a trust boundary such as between the Internet and a company database server. Having been alerted to such trust boundary through the software architecture model, a developer may choose to carefully analyze potential vulnerabilities that may impact the security of data flow across the boundary and identify precautions that may be taken to mitigate the threat. Conversely, a developer may choose to scrutinize less thoroughly data that flows between components disposed entirely within the same trust level.

Different trust boundaries may be associated with different configurations of the components of a system. Trust boundaries are typically used in defining a threat model. As such they are a part of the system architecture model. There may be more than one kind of trust boundary. For example, there may be a "process boundary" separates two processes on the same machine and that demarcates a trust boundary between the processes. There may be a more generic trust boundary between a server and a user device to signify a lack of trust the server should have for the user if, for example, the user device accesses the system from the public internet. The effect of inserting trust boundaries into an architecture model is to adjust the set of threats enumerated. For example, inserting a trust boundary between two components that are connected by a communication channel alerts a software architect or security analyst, who are involved in building the system, of the possible need to require some form of authentication as a prerequisite to communication over the channel.

FIG. 1 is an illustrative drawing of a data flow diagram of an example software-configured system architecture model. This example architecture model includes three components, an interactor, i.e. a user device, a process, "My process", and data storage. The architecture model shows that the data flow between the interactor and the process communicates commands sent by the user device to the process and communicates responses sent by the process to the interactor. The data flow between the process and the data storage communicates configuration information sent by the process to the data storage and communicates results information from the data storage to the process.

The illustrative architecture model of FIG. 1 includes a "trust boundary" between the process and the interactor, to indicate that the process may not trust the interactor and vice versa. Such a model may be created using a software based threat modeling tool, that runs on a computer system (not shown) by selecting architecture-level components from the tool's component library that best match the components of the actual system, and then choosing from the tool's connection library to choose architecture-level connection components that best represent the actual connections between the components of the actual system. Once an architecture model has been constructed, an architect or security analyst can identify trust and process boundaries within the resulting architecture model.

A threat modeling tool can be used to associate information about potential vulnerabilities with trust boundaries. A typical software based threat modeling tool identifies different potential mitigations for different kinds of threats. For example, in the illustrative model of FIG. 1, communications across the example trust boundary between the initiator and My Process may be vulnerable to a threat referred to as 'tampering'. A threat modeling tool may identify several different kinds of possible tampering and may identify different mitigations that may be employed to address these different variations of the tampering threat. The identified threat mitigations may be used to build a more secure system. Note that a threat modeling tool may also enumerate threats that do not cross a trust boundary. However, these may be lower priority for a developer to consider mitigating although that is not guaranteed to be the case.

Computer program code encoded in a computer readable storage device that is developed and implemented pursuant to a system architectural model or conversely, that a system architecture model has been created to represent, is referred to herein as the 'as-built' code. The as-built code comprises the actual code implementation of a system design. The as-built code is used to actually configure one or more machines to physically act as the components specified within a system architecture model.

Unfortunately, there is an inherent mismatch between as-built software and an architectural level description of a system configured using the software. For example, the actual runtime structures of the as-built software may not even be known until the program executes. Clients and servers and communication channels (e.g., socket connections) may come and go dynamically (i.e., be instantiated and killed). Components (e.g., Dynamic Linked Libraries) not under direct control of the implementers may be loaded dynamically, and so forth. Thus, problems may arise because a software-configured system architecture can end up not being accurately representative of the as-built software system that ultimately is created.

Accurately representing the architecture of an as-built software system can be difficult for several reasons. Many computer systems contain millions of lines of code and are deployed on a variety of hardware. Further, software system design often is implemented by a number of developers, sometimes working from different locations. As a result of the complexity of the system's structure and interdependencies, it is not uncommon for different developers working to implement different parts of a system to introduce features or even changes to the overall system that are not reflected in the architecture model. Thus, an architecture model developed based upon a software design planned at the outset of a development process, for example, may end up to not be an accurate representation of the as-built system. Conversely, an architecture model designed after the implementation exists might not reflect all of the features and functionality or components of the as-built system.

Thus, there has been a need for improvement in the use of an architecture-level model to identify and mitigate potential vulnerabilities within a system containing components configured using software.

BRIEF DESCRIPTION OF THE DRAWINGS

The aforementioned features and advantages of the invention, as well as additional features and advantages thereof, will be more clearly understandable after reading the detailed description of embodiments of the invention in conjunction with the following drawings.

DETAILED DESCRIPTION OF THE EMBODIMENTS

Figure 1:
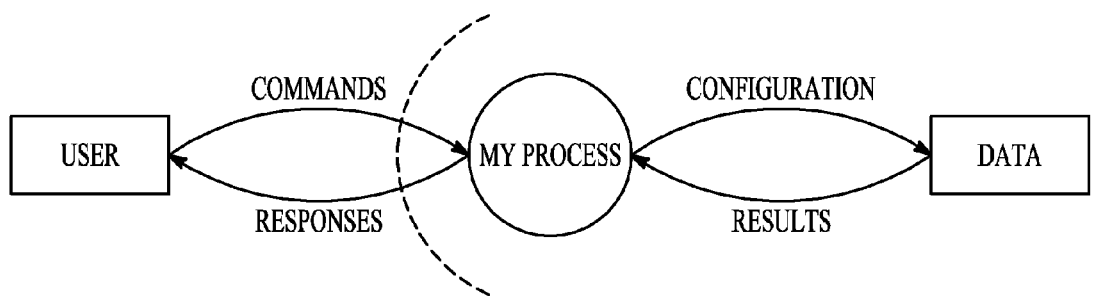
FIG. 1 is an illustrative drawing of a data flow diagram of an example software-configured system architecture model.

The following description is presented to enable any person skilled in the art to make and use a computer implemented system and method and apparatus to conduct threat assessment of a software-configured system, and is provided in the context of particular uses and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Overview

In accordance with some embodiments, an architecture level model of a system is produced that indicates interactions among components of the system. The architecture model comprises an information structure encoded in a computer readable storage device that can be used by a computer to generate a computer screen display representing the architecture. Trust boundaries indicate potential vulnerabilities that may arise from a variety of sources. However, vulnerabilities may be identified in components and connections that do not have a trust boundary. In a sense, a threat modeling tool may make a "worst case" assumption and output all possible threats assuming there is a trust boundary between every component in an architecture model. In general, vulnerabilities identified by a threat model involve high-level theoretical problems to be understood and interpreted by the person using the threat modeling tool. Possible vulnerabilities may be identified, for example, based upon security bulletins (e.g., NIST, Symantec SecurityFocus, CERT), bug trackers (e.g., nt/bugtraq, Bugzilla, cve) and other sources.

An article of manufacture (e.g., a computer readable memory device) encoded with an architecture model is transformed to an article encoded with a threat model based upon the potential vulnerabilities and mitigation techniques. The transformation of architecture model to threat model involves associating indicia of the vulnerabilities and mitigation techniques with the architecture model in an information structure in computer readable storage device. The article containing the threat model is transformed to article containing an augmented threat model that associates indicia of as-built code attributes and/or patterns that are indicative of whether mitigation techniques have been incorporated into as-built code with the indicia of vulnerabilities and mitigation techniques.

Attributes of the as-built code are observed that correspond to components of the architecture model to determine whether vulnerabilities identified for the architecture model are mitigated in the as-built code. More specifically, in some embodiments, the as built code is analyzed using static and/or dynamic code analysis techniques to produce an output log encoded in an article of manufacture that provides indicia of attributes of the as-built code indicative of whether identified vulnerabilities have been mitigated adequately.

Attributes of the as-built code are mapped to components of the architecture model. An association is created in a computer readable storage device between respective observed as-built code attributes and mitigations associated in the augmented threat model with respective architecture components mapped to the observed attributes. Attributes and/or patterns within the augmented threat model are matched to corresponding observed attributes of the as-built code to assess whether the as-built code adequately mitigates vulnerabilities identified in the threat model.

Transformation of Architecture Model to Threat Model

Figure 2A:
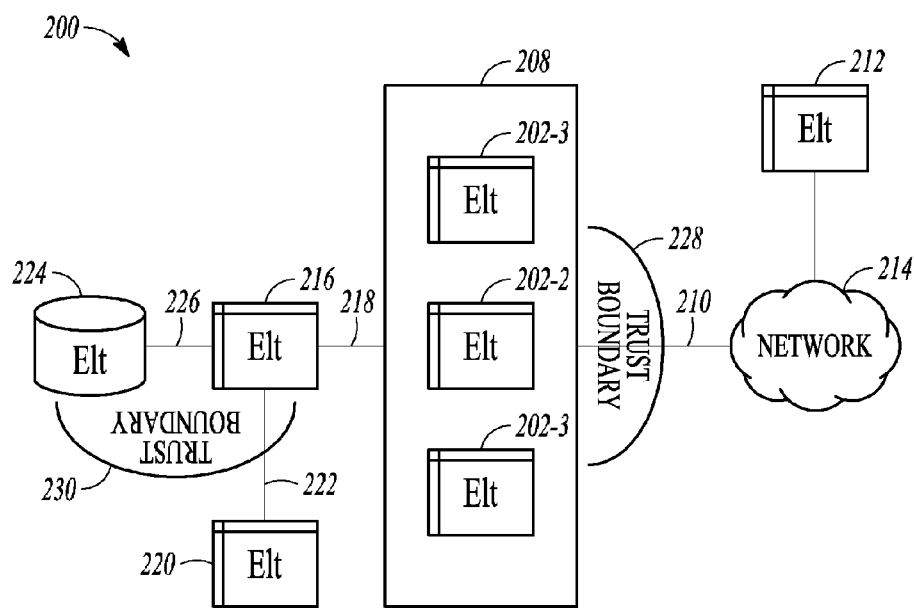
FIGS. 2A-2C are illustrative drawings that portray an example software-configured system architecture model (FIG. 2A) and a transformation of the model to a threat model (FIGS. 2B-2C) in accordance with some embodiments.
Figure 2B:
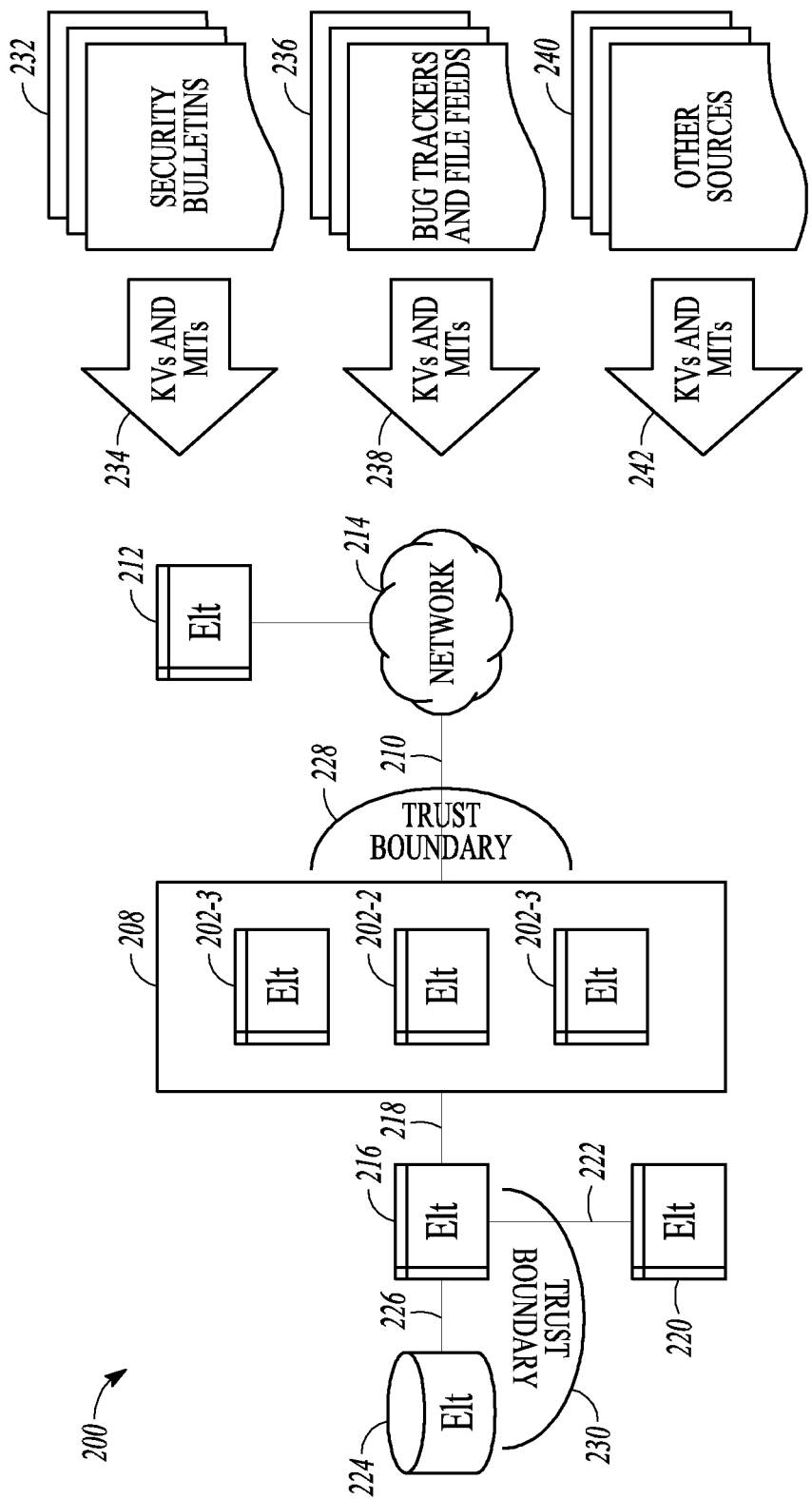
Figure 2C:
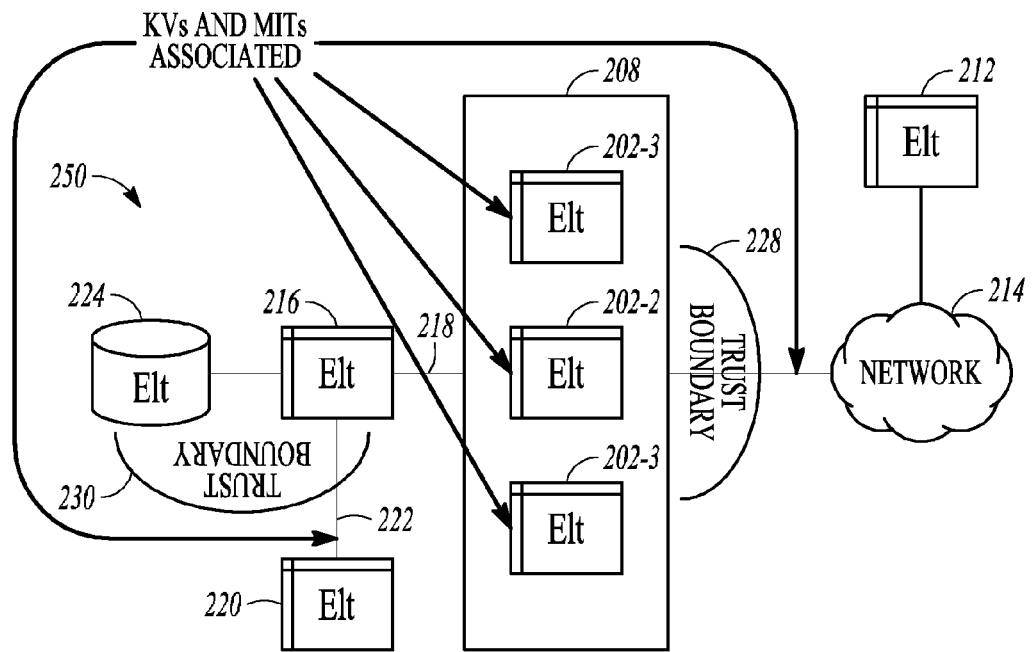

FIGS. 2A-2C are illustrative drawings that portray an example software-configured system architecture model encoded in a computer readable storage device (FIG. 2A) and a transformation of the model to a threat model encoded in a computer readable storage device (FIGS. 2B-2C) in accordance with some embodiments. The system architecture model 200 includes multiple components, and each component corresponds to one or more machines configured using computer program code. The system architecture 200 also includes communication channels between components. It will be appreciated that in an actual implementation of the model 200, one physical (or virtual) machine may be configured with computer software to serve in the role of multiple components of the model, and conversely, multiple physical (or virtual) machines may be configured with computer software to serve in the role of a given component. Moreover, communication channels may be created and taken down dynamically as, for instance, with the formation of socket connections. The architecture model comprises an information structure encoded in a computer readable storage device that can be used by a computer system to generate a non-transitory visual image of the model on a screen display. The information structure includes information that represents the components, communication channels, and trust boundaries within the architecture model 200.

The system architecture model 200 includes first, second and third components 202-1 to 202-3 within a bounded region 208. The components within the bounded region 208 communicate via communication channel 210 with a fourth component 212 coupled within a network indicated by the cloud 214. The components within the bounded region 208 communicate with a fifth component 216 via communication channel 218. The fifth component communicates with a sixth component 220 via communication channel 222 and communicates with a seventh component 224 via communication channel 226. A first trust boundary 228 is designated between the components within the bounded region 208 and the fourth component 212. A second trust boundary 230 is designated between the fifth component 216 and the sixth component 220. The trust boundaries 228 and 230 within the data structure indicate communications paths within the model 200 that may be particularly vulnerable to one or more threats.

FIG. 2B is an illustrative drawing of the example architecture model 200 together with indicia of illustrative known threats and mitigations used to transform the architecture model to a threat model. Security bulletins 232, for example, can be a source of first known vulnerabilities ("kvs") and mitigations 234. Bug trackers and file feeds 236 also can be a source of second kvs and mitigations 238. There also may be other sources 240 of third kvs and mitigations 242.

FIG. 2C is an illustrative drawing that depicts the transformation of the example architecture model 200 to a threat model 250 through the association of indicia of kvs and mitigations with components and communication channels within the threat model 250. In this example, the threat model 250 is defined relative to trust boundaries. Known vulnerabilities and mitigations are associated with model components within the trust boundaries and communication channels that cross trust boundaries. In this example, first known vulnerabilities and first mitigations are associated with components 202-1 to 202-3, which communicate over a first communication channel 210, across the first trust boundary 228, with component 212. Second known vulnerabilities and second mitigations are associated with the first communication channel 210, which crosses the first trust boundary 228. Third known vulnerabilities and third mitigations are associated with a second communication channel 222, which crosses the second trust boundary 230, Note that some known vulnerabilities and mitigations may be common to multiple components or channels. Other known vulnerabilities and mitigations also may be associated with components and communication channels within the threat model 250. The threat model 250 comprises a machine readable storage device that contains a non-transitory information structure that is encoded in a computer readable storage and that can be used to configure a computer to generate a visual display representation of the threat model 250.

Note that vulnerabilities and mitigations can apply to any component in an architecture model, and also any communication channel or other connector between components, such as the communication channel 218 between 216 and 208, for example, which does not cross a trust boundary. Trust boundaries may indicate an area of higher priority to investigate, but they are not the only places where security issues may arise. The threat model can take into account all possible threats that can occur for each element or on the connections between elements.

Transformation of a Threat Model to an Augmented Threat Model

Figure 3A:
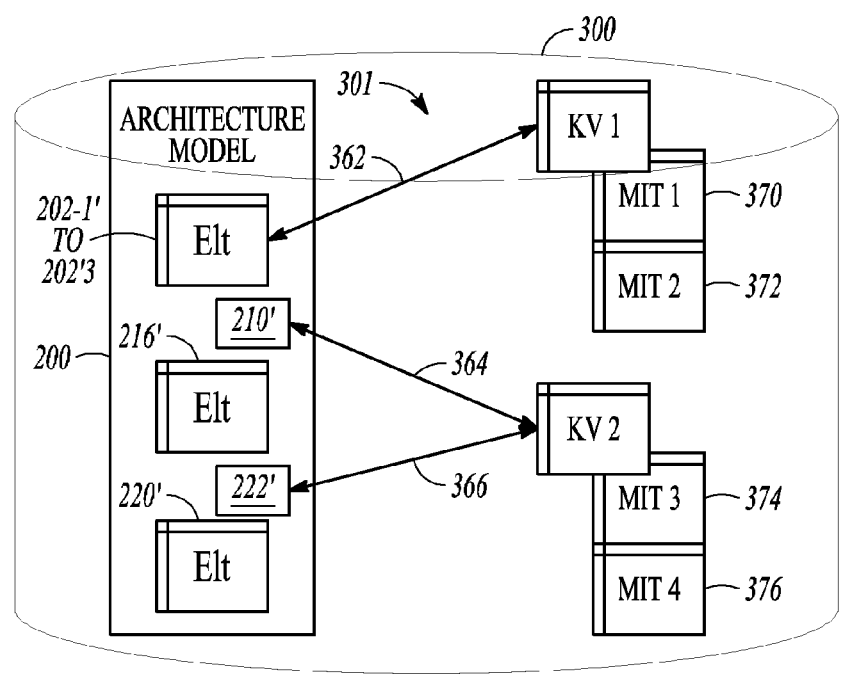
FIGS. 3A-3B are illustrative drawings of transformation of a first data structure representing a threat model (FIG. 3A) to a second data structure representing an augmented threat model (FIG. 3B) in accordance with some embodiments.
Figure 3B:
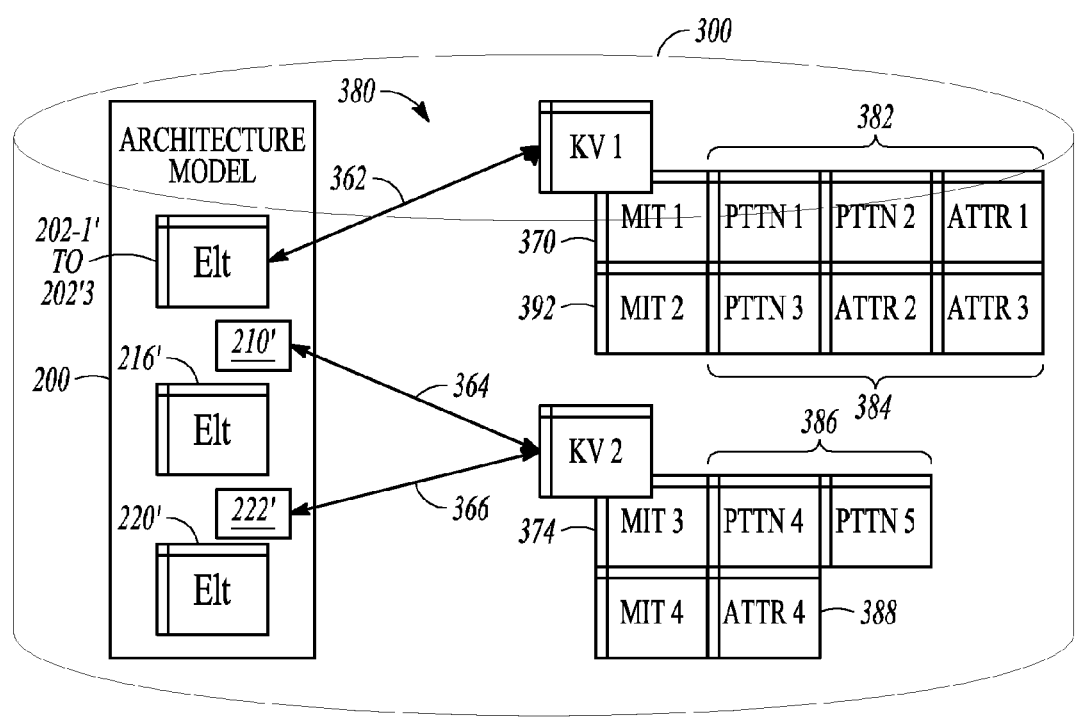

FIGS. 3A-3B are illustrative drawings of transformation of a first data structure 301 representing a threat model (FIG. 3A) to a second data structure 380 representing an augmented threat model (FIG. 3B) in accordance with some embodiments. FIG. 3A is an illustrative drawing of a machine readable storage device 300 that includes an example first data structure 301 that includes respective elements that correspond to components of the architecture model 200. In this illustrative example, a respective first data structure element labeled 202-1' to 202-3' corresponds identically to components 202-1 to 202-3 (which themselves are identical) shown in FIGS. 2A-2C. A second data structure element 216' corresponds identically to component 216 in FIGS. 2A-2C. T A third data structure element 220' corresponds identically to component 220 in FIGS. 2A-2C. A fourth data structure element 210' corresponds to the first communication channel 210 in FIGS. 2A-2C. A fifth data structure element 222' corresponds to the second communication channel 222 of FIGS. 2A-2C. The first data structure includes indicia of a first known vulnerability (kv1) and indicia of a second known vulnerability (kv2). The first data structure includes indicia of first and second mitigations (Mit1, Mit2) for kv1. The first data structure includes indicia of third and fourth mitigations (Mit3, Mit4) for kv2.

The first data structure 301 includes a first association 362 between the first data structure element 202-1' to 202-3' and kv1. The first data structure includes a second association 364 between the fourth data structure element 210' and kv2. The first data structure includes a third association 366 between the first data structure element 222' and kv2. The first data structure 301 also includes associations 370, 372 between known vulnerability kv1 and mitigations Mit1 and Mit2. The first data structure includes associations 374, 376 between known vulnerability kv2 and mitigations Mit3 and Mit4.

In creating associations 362-366, a determination is made as to which associations should exist and information is stored regarding the associations determined to exist. In general, a determination is accomplished by using a threat modeling tool to inspect each component and connector within an architecture model for what information is known about each. In general each component may have a different type: for example, one element may be a web server and another element may be a database system. Similarly connections may have additional attribute information specifying what kind of connector/connection is being used. This information is input into a storage device that stores a threat model by a person designing the architecture model. The associations are typically stored in a file or database.

FIG. 3B is an illustrative drawing of the machine readable storage device 300 that includes an example second (augmented threat model) data structure 380 that includes respective elements that correspond to components of the architecture model 200. Structures within the second data structure 380 that are identical to those of the first data structure 301 are labeled with identical reference numerals. The second example data structure 380 includes association structures 382 that associate the first mitigation (Mit1) to respective indicia of patterns ptn1 and pttn2 and to respective indicia of attribute attr1. The second example data structure 380 includes association structures 384 that associate the second mitigation (Mit2) to respective indicia of pattern ptn3 and to respective indicia of attributes attr3 and attr3. The second example data structure 380 includes association structures 386 that associate the third mitigation (Mit3) to respective indicia of patterns ptn4 and ptn5. The second example data structure 380 includes association structures 388 that associate the fourth mitigation (Mit4) to respective indicia of attribute attr5.

Observation Points to Observe Attributes of 'as-Built' Code

Observation points and corresponding observation information to be gathered are identified to elicit information from the as-built code that is indicative of whether kvs are mitigated adequately. Observation points identify characteristics of code elements within the as-built code that are expected to provide indicia of whether the as-built code contains mitigations specified in the threat model such as, instructions, parameters, data, code element characteristics (e.g., source code file, folder structure, programming language, classes, objects, methods), or relationships between source code segments (e.g., inheritance, shared interfaces, object instantiation, methods calls). Corresponding observation information to be gathered indicates the kind of information to be observed during analysis of the as-built code to elicit information from the as-built code about the presence or absence of mitigations within the as-built code that correspond to recommended mitigations of vulnerabilities associated with trust boundaries within the architecture level threat model 250.

For example, an observation point may identify a communication channel between two specified entities as being an event to be observed. Observation information may identify information to be obtained concerning such observation point. Static and/or dynamic analysis techniques then may be employed to observe an as-built code implementation of the identified communication between the specified entities. Later, a determination can be made as to whether the encryption meets mitigation requirements set forth in a corresponding augmented threat model.

Assume, for example, that tampering with a communication channel is a known vulnerability identified in an augmented threat model, which defines mitigations to the threat. Further assume, for example, that an observation point is defined as all communication channels created between components within the architecture. Assume further, for example, that observation information is defined as, (i) the kind of channel, (ii) whether the channel is encrypted, (iii) whether a user communicating across the channel has been authenticated, (iv) the kind of protocol used. Static and/or dynamic analysis then could be performed by using the observation point and corresponding observation information to observe attributes of the as-built code. Specific information as to (i)-(iv) could be ascertained for each observed communication channel configured pursuant to the as-built code. The specific information gleaned from the as-built code for a given communication channel would constitute 'attributes' of that channel. A communication channel configuration of a machine created pursuant to the as-built code observed through analysis could be mapped back to the augmented threat model, and the attributes identified for the channel created pursuant to the as-built code could be used to determine whether the as-built code adequately mitigates a known threat according to the augmented threat model.

Referring to the architecture threat model 250 of FIG. 2C, assume hypothetically for example, that an observation point is defined to observe attributes of the as-built code that correspond to the 'relationship' between components 202-1 to 202-3 and component 212. Let symbol "A" refer to an element of the as-built code that correspond to any one of components 202-1 to 202-3. Let symbol "B" correspond to elements of the as-built code that correspond to component 212. Let symbol "(A,B)" refer to elements of the as-built code that correspond to the first communications channel 210 between any one of components 202-1 to 202-3 on the one hand and component 212 on the other hand. Thus, the symbol (A,B) in effect represents an "edge" between A and B, and not either A or B by itself.

Assume that an observation point (A,B) is defined. Observation point (A,B) encompasses communications between A and B that correspond to communications between any one of components 202-1 to 202-3 and component 212 over the first communication channel 210 across the first trust boundary 228. Observation point (A,B) also may be used to identify attributes of the as-built code associated with communications between A and B that correspond to mitigations associated with components 202-1 to 202-3 in the threat model 250 or that correspond to mitigations associated with the first communication channel 210'. Therefore, observation point (A,B) specifies as-built code elements that correspond to an architecture level first communication channel 210 across the first trust boundary 228. The observation point (A,B) can be used to identify attributes of the as-built code that are indicative of the presence or absence of mitigations of threats associated with the first communication channel 210 and with the first trust boundary 228.

Similarly, assume that an observation point "(C,D)" is defined to observe attributes of as-built code that correspond to the 'relationship' between component 216 and component 220 of the architecture model that communicate over the second communication channel 222 across the second trust boundary 230. Let symbol "C" refer to elements of the as-built code that correspond to component 216. Let symbol "D" refer to elements of the as-built code that correspond to component 220. Symbol "(C,D)" refers to elements of the as-built code that correspond to the communication channel 222 between components 216 and 220, which represents the communications relationship between them. The observation point (C,D) can be used to identify attributes associated with the as-built code that that are indicative of the presence or absence of mitigations of threats associated with the second threat boundary 230.

Indicia of the defined observation points (A,B) and (C,D) are stored in a computer readable storage device for use in the course of static and/or dynamic analysis of the as-built code. Observation points are also can be created for any and all communications between any component and any other component.

Static Analysis

Figure 5:
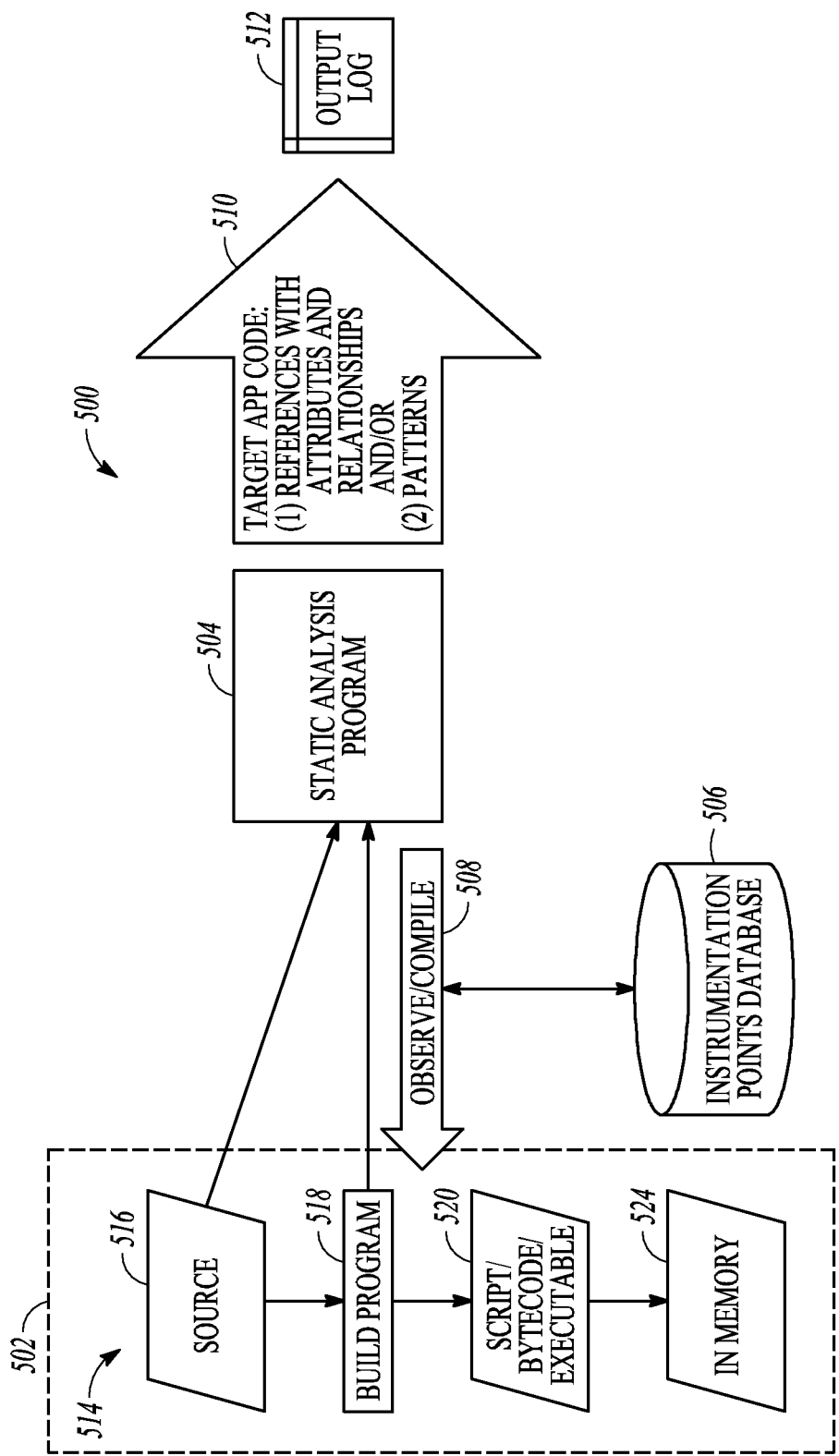
FIG. 5 is an illustrative drawing of a process to observe as-built code using a static analysis technique in accordance with some embodiments.

FIG. 5 is an illustrative drawing of a process 500 to observe as-built code using a static analysis technique in accordance with some embodiments. Translation module 502 represents a machine to translate 'as-built' source code to executable code. Static analysis module 504 represents configuration of a machine to perform static analysis of the as-built source code in the course of its translation to executable code. Continuing with the above example, an observation points database 506 that comprises a computer readable storage device encoded with observation points such as (A,B) and (C,D) and corresponding observation information associated with the as-built code to be observed in the course of translation of the as-built code from source to executable. Arrow 508 signifies that the static analysis module 504 configures a machine to observe points within the as-built code that are indicated in the observation database 506 as the source code is translated to executable code by a machine configured pursuant to the translation module 502. Arrow 510 signifies that the machine configured according to static analysis module 504 produces information concerning the as-built code that is captured within an output log 512.

A flow diagram 514 shown within translation module 502 indicates flow of a process 514 performed using one or more machines configured to perform the source-to-executable translation. Block 516 represents computer readable storage encoded with a source code version of as-built code corresponding to a threat model of a system architecture such as that represented by FIG. 3B. Block 520 represents computer readable storage encoded with an executable code version of as-built code (e.g. script or bytecode) corresponding to the augmented threat model. Block 518 represents configuration of a machine to perform a 'Build' process to translate the source to executable. Block 524 represents the running program. That is, block 524 represents the program as it executes at runtime to configure one or more physical (or virtual) machines to perform some process or function.

Static analysis module 504 is implemented using static analysis debugging tools that operate on static code (i.e., code that is not running during the analysis process). Static analysis tools ordinarily operate in the course of compilation (i.e. translation) of source code to executable code. Commonly assigned U.S. Pat. No. 7,340,726, invented by Chelf et al., discloses a static analysis process that can be used in accordance with some embodiments. Translation of source-to-executable often involves development environments, source code, compilers, and ancillary software components that are distributed across many different directories and systems. As a result of this complexity, software developers typically use Build management utilities, represented by module 518, such as the "Make" program to assist in the process of building executable code. The static analysis module 504 produces the output log 512, which reports operations performed by the build module 518. For example, an output produced by the build module 518 may be directed to a file (not shown) that is accessed by the static analysis module 504 as dictated by the observation points database 506. The log output 512 is stored in a computer readable storage device indicated by module 524.

Dynamic Analysis

Figure 6:
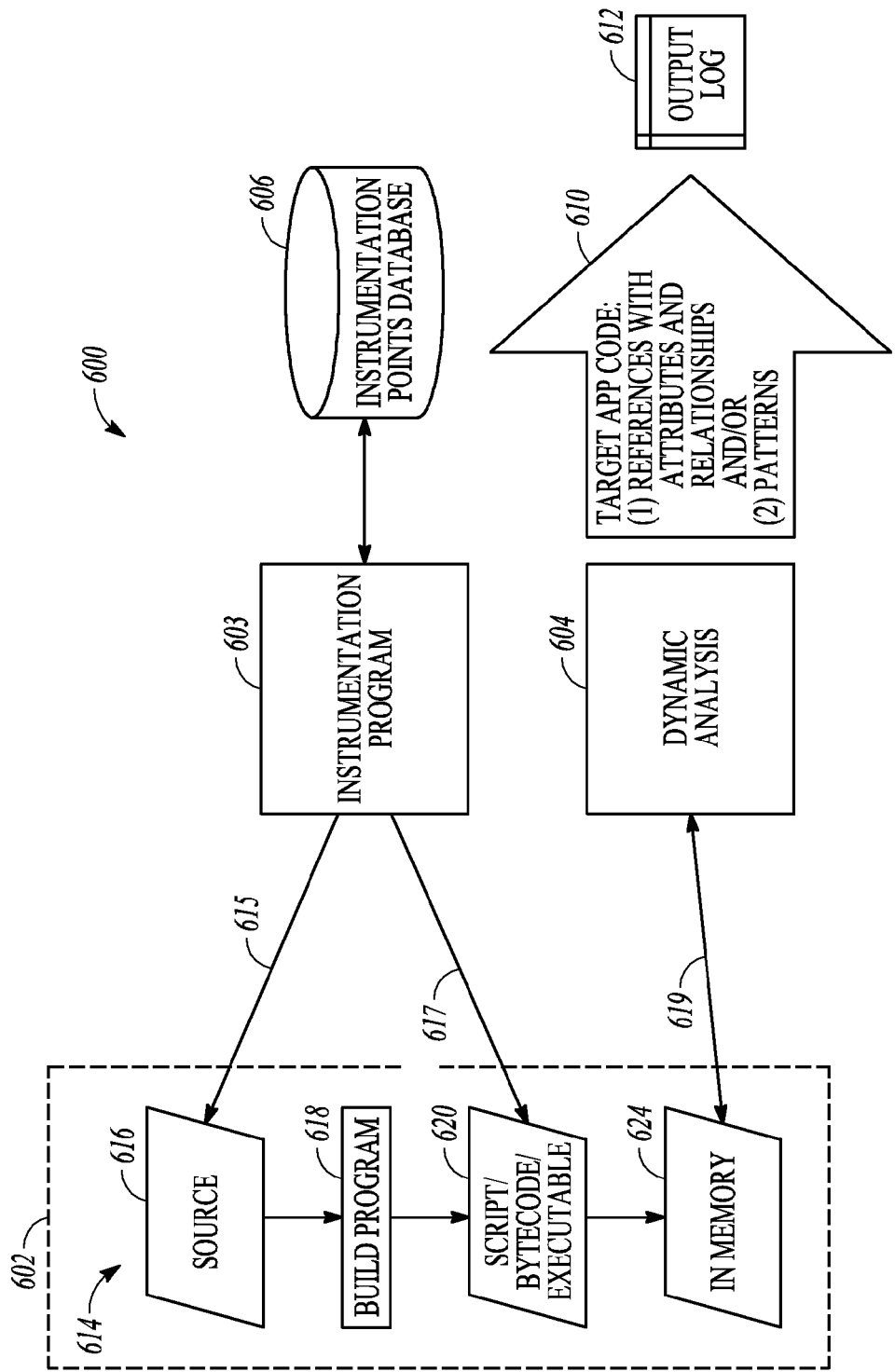
FIG. 6 is an illustrative drawing of a process to instrument and observe as-built code using a dynamic analysis technique in accordance with some embodiments.

FIG. 6 is an illustrative drawing of a process 600 to instrument and observe as-built code using a dynamic analysis technique in accordance with some embodiments. Translation and run-time module 602 represents a machine configured to translate instrumented 'as-built' source code to executable code and to run the instrumented executable code. Instrumentation module 603 represents a machine configured to instrument as-built source code in accordance with information (e.g., observation points) within an observation points database 606 that comprises a computer readable storage device encoded with observation points and corresponding observation information. Dynamic analysis module 604 represents configuration of a machine to perform dynamic analysis of as-built executable code in the course of run-time execution. Dynamic analysis refers to obtaining instrumentation data for an executable program while the program is executing on a machine. U.S. Pat. No. 5,335,344, invented by Hastings, discloses a known dynamic analysis process. Arrow 610 signifies that the machine configured according to dynamic analysis module 604 produces information concerning the as-built code that is captured within an output log 612.

A flow diagram 614 shown within translation module 602 indicates flow of a process performed by one or more machines configured to perform the source-to-executable translation and run-time execution of the executable code. Block 616 represents computer readable storage device encoded with a source code version of as-built code corresponding to a threat model of a system architecture such as that represented by FIG. 3B. Arrow 615 represents instrumenting of the as-built source code. Block 618 represents configuration of a machine to perform a Build process to translate the source to executable. Dynamic instrumentation can be added at different temporal points. Arrow 617 represents dynamic instrumentation being added to the binaries (executable code) or bytecode. This is an alternative to instrumenting the as-built source code represented by arrow 615. Block 620 represents computer readable storage encoded with an executable code version of as-built code (e.g. script or bytecode). Arrow 619 represents dynamic analysis of the instrumented executable using the dynamic analysis module 604. Block 624 represents the running program with dynamic instrumentation. That is, block 624 represents the program as it executes at runtime to configure one or more physical (or virtual) machines to perform some process or function.

The dynamic analysis module 604 uses run-time output 619 generated using the instrumentation to produce the output log 612, which reports operations performed during run-time execution of the 'as-built' code. Instrumentation code created pursuant to the observation points (e.g., (A,B) and (C,D)) and inserted into the as-built code is used to collect information about the runtime execution of the as-built code that is indicative of the internal workings of the as-built code. The log output 612 is stored in a computer readable storage device.

Output Log Information

The output log 512, 612 includes entries that comprise observations concerning portions of as-built code that correspond to observation points and corresponding observation information encoded within a computer readable storage device that comprises the observation points database 506, 606.

Continuing with the above hypothetical example, assume that for the observation point (A,B), "A" assume that in the as-built code, "A" corresponds to any of IP addresses IP1, IP2 and IP3, which are the IP addresses of machines that implement components 202-1 to 202-3 in the as-built code. Additionally, assume that in the as-built code, "B" corresponds to IP address IP12, which is the IP address of the machine that implements component 212 in the as-built code. Moreover, assume that corresponding observation information specifies two attributes: kind data and kind of encryption (if any).

Further, assume that for the observation point (C,D) in the as-built code, "C" corresponds to IP address IP16, and "D" corresponds to IP address IP20, which are the IP addresses of the machines that implement components 216 and 220, respectively, in the as-built code.

Next, assume, for instance, instrumentation of the as-built code to observe observation point (A,B) during dynamic analysis results in generation of the illustrative output log entry like that shown in the Table 1 below within the output log 612.

TABLE 1

| Output Log Entry | |
|---|---|
| Observation point | (A,B) |
| code reference | filename foo; line 5006 |
| observed communication | Machine identified by IP1 communicates with machine identified by IP12, and sends over some XML data encrypted with SSL2.0 |

The observation point within the output log entry indicates that the entry is created in response to the observation point (A,B). As explained above, (A,B) identifies a relationship between "A" and "B". Specifically, (A,B) identifies a communication relationship between A and B. In the hypothetical example, "A" corresponds to any of components 202-1 to 202-3 in the threat model and in the augmented threat model, and "B" corresponds to component 212 in the threat model and in the augmented threat model, and (A,B) corresponds the first communication channel 210.

The code reference within the output log entry indicates that code at line 5006 within a file named "foo", is the location of the portion of the as-built code that resulted in the generation of this output log entry.

The observed communication within the output log entry identifies the observed communication relationship in the as-built code as communication between a machine identified by IP address IP1 and a machine identified by IP address IP12.

The observed communication entry within the output log entry identifies an attribute of the communication as XML data being the kind of data that is sent.

The observed communication entry within the output log entry also identifies an attribute of the communication as encrypting of the sent data with SSL2.0.

In this example output log entry, the communication relationship (IP1 communicates with IP12) and the attribute information (XML data; SSL2.0) are embedded together with the 'observed communication entry'. The attributes, therefore, are 'associated' with the observation of communication (A,B) involving machine IP1 and machine IP12.

It will be appreciated that the above Table 1 provides just one hypothetical example output log entry produced during dynamic analysis in response to observation point (A,B). Other output log entries may be produced in response to observation point (A,B) that involve other machines. Also, output log entries may be produced in response to observation point (C,D)

The following are further examples of some attribute-related information that may be elicited from as-built code and included in an output log based upon observation points associated with trust boundaries in an architecture model. In general, an attribute comprises information elicited using static or dynamic analysis about as-built code structures that correspond to components of the architecture model. Attribute information, for example, may include:

An attribute NAME, VALUE, and TYPE.

An attribute reference to a specific ELEMENT or RELATIONSHIP (e.g. communications).

NAME: a string describing the attribute

VALUE: drawn from the TYPE.

TYPE: universe of values. E.g. "int" might be a type referring to integers, and "42" would be a specific value. Types and values could be more complex than simple data types; they could be complex data structures.

ELEMENT: an element in the architecture model.

RELATIONSHIP: an edge between two elements.

Figure 7:
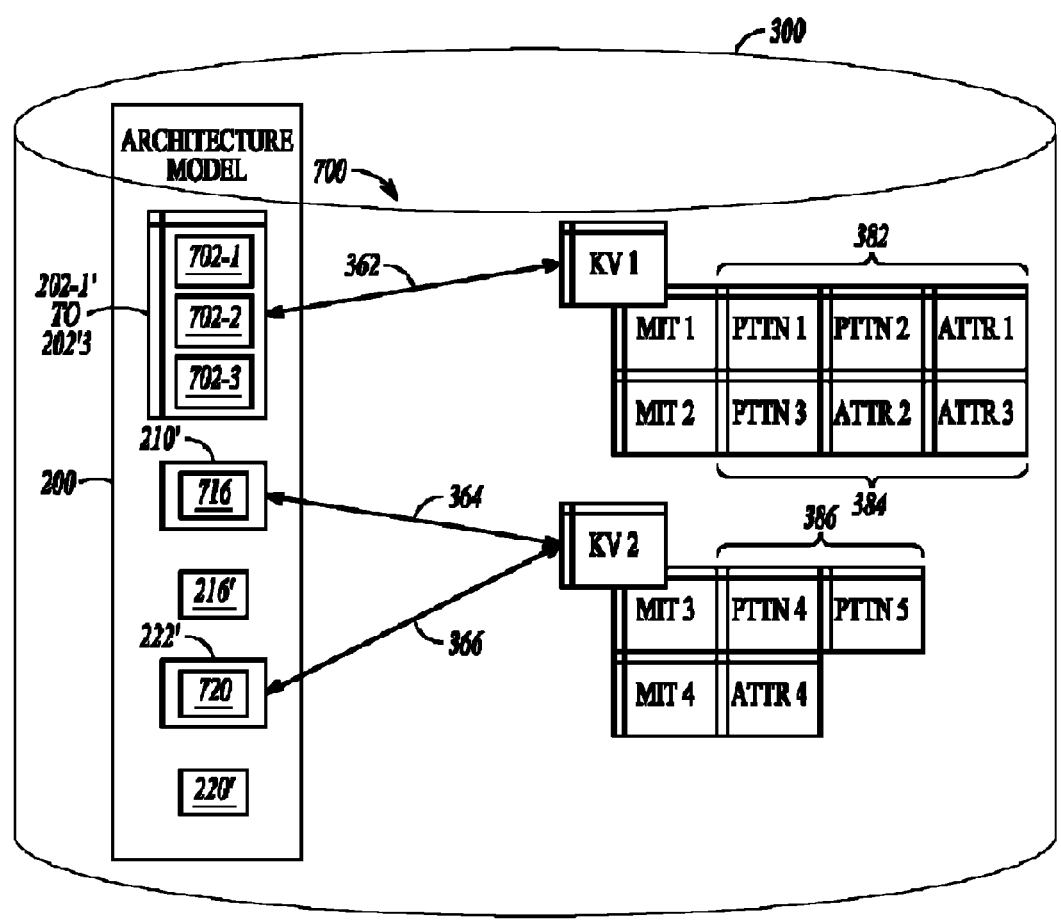
FIG. 7 is an illustrative drawing of an as-built code mitigation analysis model in accordance with some embodiments.

Transformation of Augmented Threat Model to as-Built Code Mitigation Analysis Model FIG. 7 is an illustrative drawing of an as-built code mitigation analysis model 700 in accordance with some embodiments. The as-built code analysis model is stored in computer readable storage device and is created through transformation of the augmented threat model 380 of FIG. 3B. Continuing with the above example, output log entries from the output log 512, 612 are mapped to components of the augmented threat model 380 to transform it to become the as-built code analysis model 700. In the as-built code analysis model 700, first output log entry information 702-1 to 702-3 is associated with first data structure element 202-1' to 202-3'; second output log entry information 716 is associated with fourth data structure element 210'; and third output log entry information 720 is associated with fifth data structure element 222'. Components and structures of the models 700 and 380 that are substantially the same are identified with identical reference numerals.

Continuing with the above hypothetical example, assume the dynamic analysis output log 612 includes three communications entries for (A,B). Further, assume that in a first entry 701, "A" corresponds to IP1 as shown in the above Table 1, which represents a first machine involved in communication with "B". In a second entry 702-2, "A" corresponds to IP2 which represents a second machine involved in communication with "B". In a third entry 702-3, "A" corresponds to IP3, which represents a third machine involved in communication with "B". Since each entry corresponds to (A,B), and it is known that each occurrence of "A" corresponds to one of components 202-1, 202-2 and 202-3, each of the three entries 702-1 to 702-3 are mapped to and become associated with data structure element 202-1' to 202-3'.

It is assumed for the purpose of this example that an output log entry 716 is produced through static and/or dynamic analysis for an observation point corresponding to the fourth data structure element 210' that corresponds to the first communication channel 210 in the augmented threat model, and that an output log entry 720 is produced through static and/or dynamic analysis for an observation point corresponding to the fifth data structure element 222' that corresponds to communication channel 222 in the augmented threat model.

Figure 4:
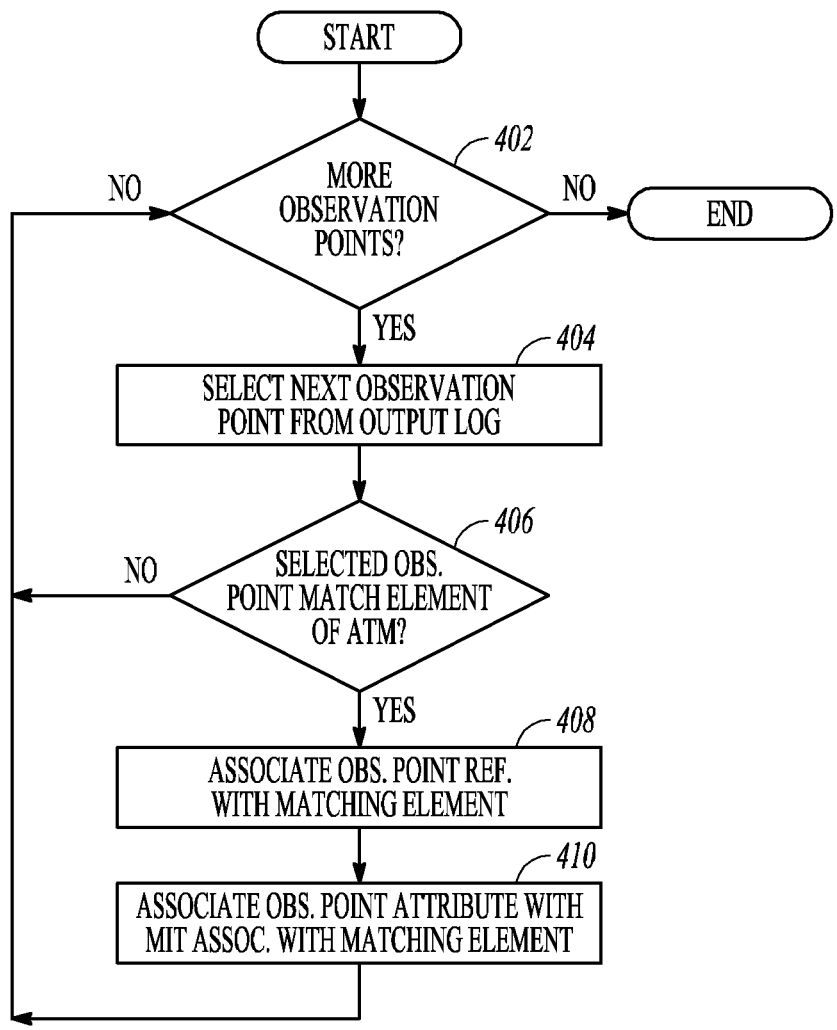
FIG. 4 is an illustrative flow diagram of a process to transform an augmented threat model to an as-built code mitigation analysis model in accordance with some embodiments.

FIG. 4 is an illustrative flow diagram of a process 400 to transform an augmented threat model to an as-built code mitigation analysis model 700 in accordance with some embodiments. It will be appreciated that modules of the diagram correspond to computer program code (not shown) that configure a computer system (not shown) to perform the acts represented by the different modules. Decision module 402 determines whether there are additional observation point entries in the output log file 512, 612 that have not yet been evaluated. If an unevaluated observation point entries exist, then module 404 selects an unevaluated observation point entry. Decision module 406 determines whether indicia of the selected entry can be matched to indicia of an element of the augmented threat model 380. It will be appreciated, for example, that observation point entries may be created that do not map to entries of the augmented threat model. For instance, an observation point may be created for a communication channel created by as-built code between entities that are within the same trust boundary and for which no known vulnerability is identified. Thus, there would be no element within the augmented threat model 380 that corresponds to such communication channel. When there is no match, control returns to decision module 402. When a match is identified, module 408 associates a code reference from the selected entry to a matched-to element of the model 380. Module 410 associates an attribute associated with the selected entry with a known vulnerability associated with the matched-to element. It will be appreciated that, since the known vulnerability is associated with mitigations and with attributes and/or patterns of the matched-to element the entry's attribute also becomes associated with such mitigations, attributes and/or patterns of the matched-to element. Control then proceeds to decision module 402. When decision module 402 determines that there are no more observation points to be evaluated, then the process ends.

It will be appreciated that the as-built code analysis data structure can be used for purposes for which the augmented threat model cannot. In particular, for example, the as-built code analysis data structure can be used to evaluate whether actual as-built code meets vulnerability mitigation requirements specified in an augmented threat model.

Analysis of as-Built Code Using the as-Built Code Analysis Model

Figure 8:
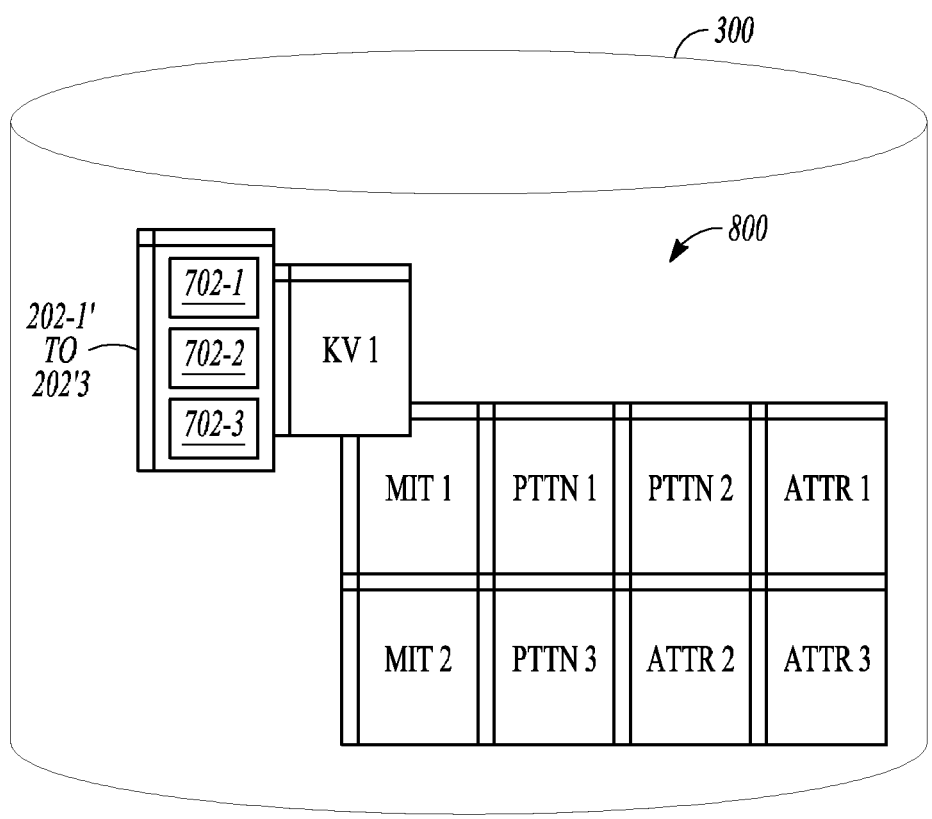
FIG. 8 is a simplified view of a data structure portion that is encoded in a machine readable storage device and that represents a portion of the model of FIG. 7 in accordance with some embodiments.

FIG. 8 is a simplified view of a data structure portion 800 that is encoded in a machine readable storage device and that represents a portion of the model 700 of FIG. 7 that is associated with kv1, in accordance with some embodiments. The data structure associates components and corresponding output log entry information with known vulnerabilities, mitigations, patterns and attributes. Assume that Mit1 and Mit2 identify first two possible techniques to mitigate kv1, which is a known vulnerability of communications. Assume that Pttn1 and Pttn2 represent two different information patterns (e.g., character strings, regular expressions, or even a script/program that outputs a true/false match based on what information is in the log) and Attr1 represents attribute information, any of which if found to be associated with as-built code, are indicative of the use of Mit1 by the as-built code to mitigate kv1. Further, assume that that Pttn3 represents an information pattern (e.g., character strings or combinations of attributes or indicia of behaviors) and Attr2 and Attr3 represent information, any of which if found to be associated with as-built code, are indicative of the use of Mit2 by the as-built code to mitigate kv1.

Assume that the first entry 702-1 in FIG. 8 corresponds to the output log entry specified in the above Table 1. The entry indicates that SSL2.0 encryption is an attribute of the communication channel corresponding to (A,B) created by the as-built code. A determination is made as to whether SSL2.0 encryption meets mitigation requirements of associated in data structure 800 with kv1. If the as-built code does not satisfy the mitigation requirements, then the code reference within the first entry 702-1 can be used to locate the portion of a source code representation of the as-built code so that appropriate steps can be made to mitigate the vulnerability in the as-built code.

In the present hypothetical example, what constitutes satisfactorily meeting a vulnerability mitigation requirement is an implementation issue. In some implementations, both Mit1 and Mit2 would have to be met to satisfactorily mitigate kv1. In other implementations, either one or the other of Mit1 and Mit2 would have to be met to satisfactorily mitigate kv1. Moreover, in some implementations, Mit1 would be determined to have been satisfied by the as-built code by finding a match between a mitigation used in the as-built code and at least one of Pttn1, Pttn2 and Attr1, and in other implementations, a match between all three would be required. Similarly, in some implementations, Mit2 would be determined to have been satisfied by the as-built code by finding a match between a mitigation used in the as-built code and at least one of Pttn2, Attr2 and Attr3, and in other implementations, a match between all three would be required.

It will be appreciated that a data structure portion (not shown) also is encoded in a machine readable storage device and that represents a portion of the model 700 of FIG. 7 that is associated with kv2, Example System Architecture Implementation In operation, in one implementation of the example system architecture 200 of FIG. 2A, user devices 212 coupled to network 214 access a cluster of webservers 202-1 to 202-3 across the first trust boundary 228. The webservers may receive user device requests and forward the requests to a backend processing server 216. The backend processing server 216 sends credentials or other sensitive information across the second trust boundary 230 to a third-party site 220, which authorizes the information. The backend processing server 216 then retrieves information from a database 224, and sends it to the webservers 202-1 to 202-3 for display as a webpage by the user device 212.

Each of the machines of the example system implementation is configured using program code encoded in non-transitory computer readable storage. In the example implementation, the webservers 202-1 to 202-3 run on a custom Apache HTTP Server modified from the version 1.3 source. The backend processing server 216 runs the primary application on JBoss Application Server 6. The external processing server 220 runs the authentication and authorization manager (e.g., JAAS) on JBoss Application Server 5. The specifics of the other architectural elements are not important for the purposes of this example.

Given the above, known vulnerabilities are identified as set forth in the following Table 2.

TABLE 2

Known Vulnerabilities:

A password might be viewed by an unauthorized party who has access to a server.
Credentials might be intercepted by an unauthorized party during transmission.
Software may be unpatched and have inherent security vulnerabilities through no direct fault of the application developers.

Given the above vulnerabilities, a threat assessment model is defined that sets forth the requirements of the following Table 3.

TABLE 3

Mitigation Requirements:

First mitigation requirement: No passwords within the application may be stored or displayed in cleartext.
Second mitigation requirement: All cross-boundary network transmission related to credentials must use strong channel encryption.
Third mitigation requirement: The application may not use third-party software that have the aforementioned security vulnerabilities.

Given the above mitigation requirements specific mitigations set forth in the following Table 4 are specified. It will be appreciated that two alternative mitigations are specified for each mitigation requirement.

TABLE 4

| Mitigation Requirement | Specific Mitigation |
| --- | --- |
| First requirement | Only storing passwords in the database in an encrypted format and nowhere else. |
| First requirement | Encrypting the password once when it is first received by the user and then never decrypting it. |
| Second requirement | Using strong channel encryption |
| Second requirement | Not transmitting credentials at all |
| Third requirement | Ensuring that third-party software components have the latest security patches |
| Third requirement | Determining that the application uses no vulnerable component within the third-party software. |

The following Table 5 specifies the place in a system-configuration architecture where each mitigation requirement is to be imposed.

TABLE 5

| Mitigation Requirement | Architecture Location |
| --- | --- |
| First requirement | Any computer that has a permanent data storage medium. |
| Second requirement | Network connections between computers. |
| Third requirement | Any software component of the application. |

These known vulnerabilities and mitigations are input into to a threat architecture data structure and are associated appropriate architecture components. In the example, each server is associated with the first and third known vulnerabilities and two network connections (that between the user devices and the webserver cluster and that between the back-end processing server and external processing server) are associated with the second known vulnerability. Thus, each component has associated vulnerabilities and mitigations.

An augmented threat model is created.

For the first known vulnerability, an attribute is defined within an augmented threat model data structure encoded in a computer readable storage device to require that all input fields in a webpage that have the word password next to them should be of TYPE=PASSWORD. Also, an attribute is defined within the augmented threat model to require that every server within the application that handles this data should not write the data to disk prior to encrypting it. Thus, the attribute requires that the application never wants to use the write( )method of a FileWriter or BufferedWriter object on a password before it has been hashed or otherwise encrypted. Finally, an attribute is defined to require that the database should not INSERT or UPDATE any unhashed or otherwise unencrypted password data.

For the first known vulnerability, an attribute is defined within an augmented threat model to require that encrypted TCP transmissions may use SSL- or TLS-encryption, so the Apache webservers must use mod_ssl appropriately. The security expert only considers 1024-bit keys to be adequate for channel encryption, so he may select these and TAM would understand how to check the key sizes in the certificates.

For the third known vulnerability, an attribute is defined within the augmented threat model to point to security bulletins and file release feeds pertinent to the third-party software being used by the application. For instance, a security expert may point the augmented threat model to the Apache HTTP Server Project Security Reports for updates on source code patches related to the first and second vulnerabilities in the Apache webservers. The augmented threat model would then have knowledge of what patched versions of an Apache web-server would look like.

With the aforementioned code patterns and attributes associated with the mitigations, the threat model now has intelligence—specific to the application—on what the application's code should look like and how it should behave.

An analysis of as-built code is performed using static and/or dynamic analysis techniques.

Suppose, for example, that an output log (not shown) includes two sets of entries for JBoss Application Servers. There also are two JBoss Application Servers in the architecture model. Information in the output log is used to determine which set of code corresponds to which actual server. For example, a determination may be made that one JBoss AS is running on version 5 and the other is version 6. If our example changes slightly and both are running on the same version of JBoss, then a determination can be made as to which JBoss AS runs code that writes to and reads from a database server, so that code is more likely to correspond to the backend processing server rather than the external processing server. Additional determinations are made to compare attributes in this manner adjusting the likelihood that a particular code segment corresponds to a particular architecture element. It will finally provide one or more potential mappings in order for the application architect to finally validate.

In the aforementioned mapping process, TAM may not have been able to match all code segments with all elements. For instance, while observing the application's runtime behavior, it may have found that the backend processing server also communicates with another server that was not found in the architecture model. Conversely, it may not have found code corresponding to the database server's codebase. In both cases, these items are flagged (identified) for the application architect to resolve by manually adding another server and relationship(s) to the model or by configuring observation points so as to observe the code for the unmatched element(s).

The augmented threat mode is used to determine whether the as-built target application conforms to the threat model. For example, for each webserver element, reference is made to the as-built target application's source code and output log to determine whether any webserver can construct a webpage that has the password input field that is not of TYPE=PASSWORD. Whenever such input fields are located, a determination can be made that there is a strong possibility that the password is being displayed in plaintext on the user's screen. As another example, code and certificates that cross the trust boundary between the backend and external processing servers can be observed to determine whether the application ensures strong channel encryption. Key lengths can be examined for signed certificates using information gathered about the keystore and SSL configuration. Also, webservers code can be observed to determine whether the Apache HTTP Servers have patches to prevent cross-site scripting within the many vulnerable Apache modules.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method comprising:
providing in a non-transitory machine readable storage device a first information structure that includes a software configured system architecture model of a system that includes a representation of multiple component machines and that includes a representation of at least one communication channel between two or more of the component machine representations and that includes an association of indicia of mitigation of a vulnerability with at least one component machine representation or at least one communication channel representation;
providing as-built code that comprises an implementation of the software configured system architecture model;
providing in a machine readable storage device, a database that identifies a code element characteristic that designates an observation point within as-built code, and wherein the database identifies observation information that corresponds to the observation point and that designates at least one observation point attribute that is indicative of whether a mitigation of the vulnerability that corresponds to the observation point is provided;
observing in the as-built code, the designated observation point and the corresponding designated at least one observation point attribute;
producing in a machine readable storage device, a log that includes an entry that identifies an observation point observed in the as-built code and that identifies at least one observation point attribute observed in the as-built code; and
using the computer to produce a map in a machine readable storage device, that associates the observation point identified within the entry with at least one component within the threat model and that associates the at least one observation point attribute identified within the entry with the indicia of mitigation associated within the threat model with the at least one component that the map associates with the observation point identified within the entry.

2. The method of claim 1,
wherein the software configured system architecture model comprises an information structure encoded in a computer readable storage device used by a computer system to generate a non-transitory visual image of the architecture model on a screen display.

3. The method of claim 1,
wherein the vulnerability comprise a vulnerability of at least of, at least one component machine represented by the associated at least one component machine representation and a communication channel represented by the associated communication channel representation.

4. The method of claim 1,
wherein the as-built code configures one or more machines to physically act as the component machines represented within the software configured system architecture model.

5. The method of claim 1,
wherein the as-built source includes bytecode.

6. The method of claim 1,
wherein he as-built code includes script code.

7. The method of claim 1,
wherein he as-built code includes executable code.

8. The method of claim 1,
wherein the map associates the indicia of mitigation with a pattern or attribute that if present in the as-built code, is indicative of the use of the mitigation technique in the as-built code to mitigate the indicated known vulnerability.

9. The method of claim 1,
wherein the observation information includes the kind of channel.

10. The method of claim 1,
wherein the observation information includes whether the channel is encrypted.

11. The method of claim 1,
wherein the observation information includes whether a user communicating across the channel has been authenticated.

12. The method of claim 1,
wherein the observation information includes the kind of protocol used in communicating over the channel.

13. The method of claim 1,
wherein the observation information includes the kind of channel.

14. The method of claim 1,
wherein the observation information includes whether the channel is encrypted.

15. The method of claim 1,
wherein the observation information includes whether a user communicating across the channel has been authenticated.

16. The method of claim 1,
wherein the observation information includes the kind of protocol used in communicating over the channel.

17. The method of claim 1,
wherein observing in the as-built code includes configuring a computer to perform static analysis of the as-built code.

18. The method of claim 1,
wherein observing in the as-built code includes configuring a computer to perform dynamic analysis of the as-built code.

19. The method of claim 1,
wherein the log entry identifies a location within the as-built code of a portion of as-built code having the observation point attribute observed in the as-built code.

20. The method of claim 1,
wherein the log entry includes at least one of a line identifier and a file identifier that identifies a location within the as-built code of a portion of as-built code having the observation point attribute observed in the as-built code.

21. A non-transitory computer readable medium comprising instructions for a method comprising:
providing in a non-transitory machine readable storage device a first information structure that includes a software configured system architecture model of a system that includes a representation of multiple component machines and that includes a representation of at least one communication channel between two or more of the component machine representations and that includes an association of indicia of mitigation of a vulnerability with at least one component machine representation or at least one communication channel representation;
providing as-built code that comprises an implementation of the software configured system architecture model;
providing in a machine readable storage device, a database that identifies a code element characteristic that designates an observation point within as-built code, and wherein the database identifies observation information that corresponds to the observation point and that designates at least one observation point attribute that is indicative of whether a mitigation of the vulnerability that corresponds to the observation point is provided;
observing in the as-built code, the designated observation point and the corresponding designated at least one observation point attribute;
producing in a machine readable storage device, a log that includes an entry that identifies an observation point observed in the as-built code and that identifies at least one observation point attribute observed in the as-built code; and
using the computer to produce a map in a machine readable storage device, that associates the observation point identified within the entry with at least one component within the threat model and that associates the at least one observation point attribute identified within the entry with the indicia of mitigation associated within the threat model with the at least one component that the map associates with the observation point identified within the entry.

22. A system comprising:
a storage device that stores instructions to configure a computing device; and
a computing device in communication with the storage device, the computing device configured to perform a method comprising:
providing in a non-transitory machine readable storage device a first information structure that includes a software configured system architecture model of a system that includes a representation of multiple component machines and that includes a representation of at least one communication channel between two or more of the component machine representations and that includes an association of indicia of mitigation of a vulnerability with at least one component machine representation or at least one communication channel representation;
providing as-built code that comprises an implementation of the software configured system architecture model;
providing in a machine readable storage device, a database that identifies a code element characteristic that designates an observation point within as-built code, and wherein the database identifies observation information that corresponds to the observation point and that designates at least one observation point attribute that is indicative of whether a mitigation of the vulnerability that corresponds to the observation point is provided;
observing in the as-built code, the designated observation point and the corresponding designated at least one observation point attribute;
producing in a machine readable storage device, a log that includes an entry that identifies an observation point observed in the as-built code and that identifies at least one observation point attribute observed in the as-built code; and
using the computer to produce a map in a machine readable storage device, that associates the observation point identified within the entry with at least one component within the threat model and that associates the at least one observation point attribute identified within the entry with the indicia of mitigation associated within the threat model with the at least one component that the map associates with the observation point identified within the entry.

* * * * *

UNITED STATES PATENT AND TRADEMARK OFFICE
CERTIFICATE OF CORRECTION

PATENT NO.         : 8,413,249 B1  
APPLICATION NO.    : 12/895847  
DATED              : April 2, 2013  
INVENTOR(S)        : Andy C. Chou Page 1 of 1

It is certified that error appears in the above-identified patent and that said Letters Patent is hereby corrected as shown below:

On the Title Page

In column 1, under Item "(75) Inventors", line 1, delete "C" and insert --C.--, therefor In column 2, under Item "(57) Abstract", line 8, after "of", delete "one", therefor In column 2, under Item "(57) Abstract", line 20, after "to", delete "at least the", therefor In the Claims In column 18, line 27, in Claim 6, delete "he" and insert --the--, therefor In column 18, line 29, in Claim 7, delete "he" and insert --the--, therefor Signed and Sealed this  
Twenty-third Day of December, 2014

Michelle K. Lee  
*Deputy Director of the United States Patent and Trademark Office*